US012343629B2

(12) United States Patent
Ni et al.

(10) Patent No.: US 12,343,629 B2
(45) Date of Patent: Jul. 1, 2025

(54) EXCHANGING POSITIONS OF VIRTUAL PROPS DISPLAYED WITH A VIRTUAL SCENE

(71) Applicant: Tencent Technology (Shenzhen) Company Limited, Guangdong (CN)

(72) Inventors: Ning Ni, Shenzhen (CN); Chaohai Tian, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 290 days.

(21) Appl. No.: 18/132,856

(22) Filed: Apr. 10, 2023

(65) Prior Publication Data

US 2023/0277931 A1  Sep. 7, 2023

Related U.S. Application Data

(63) Continuation of application No. PCT/CN2022/100875, filed on Jun. 23, 2022.

(30) Foreign Application Priority Data

Aug. 3, 2021 (CN) .......................... 202110886878.X

(51) Int. Cl.
    A63F 13/533      (2014.01)
    A63F 13/55       (2014.01)
    A63F 13/2145     (2014.01)
    A63F 13/837      (2014.01)
    G06F 3/0486      (2013.01)

(52) U.S. Cl.
    CPC ............ *A63F 13/533* (2014.09); *A63F 13/55* (2014.09); *A63F 13/2145* (2014.09); *A63F 13/837* (2014.09); *G06F 3/0486* (2013.01)

(58) Field of Classification Search
    CPC .... A63F 13/533; A63F 13/55; A63F 13/2145; A63F 13/837; A63F 13/35; A63F 2300/1075; A63F 2300/8076; G06F 3/0486; G06F 3/04817; G06F 3/0482; G06F 3/04842; G06F 3/04815; Y02P 90/02
    USPC .......................................................... 463/31
    See application file for complete search history.

(56) References Cited

FOREIGN PATENT DOCUMENTS

| CN | 107979585 A | * | 5/2018 | ............ H04L 29/06 |
| CN | 110141870 A | | 8/2019 | |
| CN | 112023396 A | * | 12/2020 | ............ A63F 13/35 |

(Continued)

OTHER PUBLICATIONS

International Search Report and Written Opinion received for PCT Patent Application No. PCT/CN2022/100875, mailed on Sep. 28, 2022, 19 pages (8 pages of English Translation and 11 pages of Original Document).

*Primary Examiner* — Michael A Cuff
(74) *Attorney, Agent, or Firm* — ArentFox Schiff LLP

(57) ABSTRACT

A method includes displaying a virtual scene, a first virtual prop and a second virtual prop being displayed with the virtual scene, and displaying exchange prompt information on the second virtual prop in response to a first triggering operation for the first virtual prop. The exchange prompt information indicates that the second virtual prop is exchangeable with the first virtual prop. The method further includes, in response to a dragging operation causing a position of the first virtual prop to meet a condition, switching positions of the first virtual prop and the second virtual prop displayed with the virtual scene.

20 Claims, 9 Drawing Sheets

(56) References Cited

FOREIGN PATENT DOCUMENTS

| CN | 112148188 A | * | 12/2020 | |
|----|-------------|---|---------|---|
| CN | 112657182 A |   | 4/2021  | |
| CN | 112791390 A |   | 5/2021  | |
| CN | 113018862 A | * | 6/2021  | ............. A63F 13/52 |
| CN | 113559494 A |   | 10/2021 | |

\* cited by examiner

EXCHANGING POSITIONS OF VIRTUAL PROPS DISPLAYED WITH A VIRTUAL SCENE

RELATED APPLICATIONS

This application is a continuation of International Application No. PCT/CN2022/100875, filed on Jun. 23, 2022, which claims priority to Chinese Patent Application No. 202110886878.X, entitled "METHOD AND APPARATUS FOR DISPLAYING VIRTUAL PROP, TERMINAL AND STORAGE MEDIUM," and filed on Aug. 3, 2021. The entire disclosures of the prior applications are hereby incorporated by reference.

FIELD OF THE TECHNOLOGY

This application relates to the technical field of terminals, including a method and apparatus for displaying a virtual prop, a terminal and a storage medium.

BACKGROUND OF THE DISCLOSURE

With the development of terminal technologies, a wide variety of game programs, such as a shooting game, a role play game and a real-time strategy game, can be set up and run on a terminal. Taking the shooting game as an example, a virtual object can be equipped with two virtual weapons in a virtual scene of the shooting game, and the two virtual weapons are displayed in different positions with the virtual scene.

SUMMARY

Embodiments of this disclosure provide a method and apparatus for displaying a virtual prop, a terminal and a storage medium.

In an embodiment, a method for displaying a virtual prop includes displaying a virtual scene, a first virtual prop and a second virtual prop being displayed with the virtual scene, and displaying exchange prompt information on the second virtual prop in response to a first triggering operation for the first virtual prop. The exchange prompt information indicates that the second virtual prop is exchangeable with the first virtual prop. The method further includes, in response to a dragging operation causing a position of the first virtual prop to meet a condition, switching positions of the first virtual prop and the second virtual prop displayed with the virtual scene.

In an embodiment, an apparatus for displaying a virtual prop includes processing circuitry configured to display a virtual scene, a first virtual prop and a second virtual prop being displayed with the virtual scene, and to display exchange prompt information on the second virtual prop in response to a first triggering operation for the first virtual prop. The exchange prompt information indicates that the second virtual prop is exchangeable with the first virtual prop. The processing circuitry is further configured to, in response to a dragging operation causing a position of the first virtual prop to meet a condition, switch positions of the first virtual prop and the second virtual prop displayed with the virtual scene.

In an embodiment, a non-transitory computer-readable storage medium storing computer-readable instructions thereon, which, when executed by processing circuitry, cause the processing circuitry to perform a method for displaying a virtual prop. The method includes displaying a virtual scene, a first virtual prop and a second virtual prop being displayed with the virtual scene, and displaying exchange prompt information on the second virtual prop in response to a first triggering operation for the first virtual prop. The exchange prompt information indicates that the second virtual prop is exchangeable with the first virtual prop. The method further includes, in response to a dragging operation causing a position of the first virtual prop to meet a condition, switching positions of the first virtual prop and the second virtual prop displayed with the virtual scene.

Technical solutions provided by the embodiments of this disclosure relate to a novel method for displaying the virtual prop. By displaying the exchange prompt information on the second virtual prop in response to performing the first triggering operation on the first virtual prop, it can be indicated to the player that positions of the first virtual prop and the second virtual prop can be exchanged, and then the positions of the first virtual prop and the second virtual prop can be exchanged by dragging the first virtual prop. As position exchanging can be realized by dragging the virtual prop, the operation is simple, convenient and fast, and the human-computer interaction efficiency is high.

DESCRIPTION OF EMBODIMENTS

Figure 1:
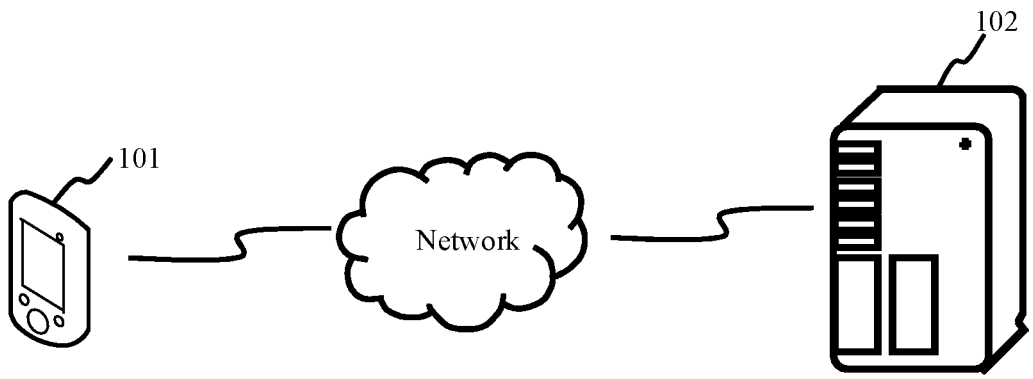
FIG. 1 is a schematic diagram of an implementation environment of a method for displaying a virtual prop provided according to one embodiment of this disclosure.

In order to make objectives, technical solutions and advantages of this disclosure clearer, implementations of this disclosure will be further described in detail below with reference to accompanying drawings.

Terms such as "first" and "second" in this disclosure are used for distinguishing the same items or similar items with basically the same effect and function. It is to be understood that "first", "second" and "$n^{th}$" neither have a dependency relationship in logic or in a timing sequence, nor limit the quantity or an executing sequence.

A term "at least one" in this disclosure refers to one or more, and "a plurality of" means two or more than two.

Terms involved in this disclosure are explained below.

Virtual scene: a virtual scene displayed (or provided) when an application program runs on a terminal. In an embodiment, the virtual scene is a simulation environment of a real word, or a semi-simulation and semi-fiction virtual environment, or a pure-fiction virtual environment. In an embodiment, the virtual scene is any one of a two-dimensional virtual scene, a 2.5-dimensional virtual scene or a three-dimensional virtual scene, and dimensionality of the virtual scene is not limited in the embodiment of this disclosure. For example, the virtual scene includes the sky, the land, the sea and the like. The land includes a desert, a city and other environmental elements. A user can control a virtual object to move in the virtual scene.

Shooter Game (STG): a type of game that the virtual object uses a shooting virtual prop for remote interaction, and a type of an action game and having clear characteristics of the action game. In an embodiment, the shooter game includes but not limited to a first-person shooting game, a third-person shooting game, an overlook shooting game, an eye-level shooting game, a platform shooting game, a scroll shooting game, a keyboard and mouse shooting game, a shooting gallery game and the like, and the type of the shooter game is not specifically limited in the embodiments of this disclosure. In the shooter game, the virtual object is equipped with one or more virtual weapons. Taking the virtual object being equipped with two virtual weapons as an example, the above two weapons are divided into a primary weapon and a secondary weapon, and the primary weapon and the secondary weapon are intended to distinguish the two virtual weapons.

Virtual object: referring to a movable object in a virtual world. The movable object is at least one of a virtual person, a virtual animal or a cartoon character. In an embodiment, when the virtual world is a three-dimensional virtual world, the virtual object is a three-dimensional stereoscopic model, and each virtual object has its own shape and size in the three-dimensional virtual world and occupies a part of space in the three-dimensional virtual world. In an embodiment, the virtual object is a three-dimensional role built based on a three-dimensional human skeleton technology and achieves different appearances by wearing different skin. In some implementations, the virtual object is implemented by using a 2.5-dimensional or two-dimensional model, which is not limited in the embodiment of this disclosure.

Virtual prop: referring to a prop used by the virtual object, such as a virtual gun, virtual drug, a virtual carrier and a virtual thrown item. The embodiment of this disclosure takes the virtual prop being the virtual gun as an example.

Backpack interface: referring to an interface for displaying the virtual prop that the virtual object has. In an embodiment, the backpack interface is divided into a left region and a right region, the left region displays a virtual prop with which the virtual object is already equipped, the right region displays a virtual prop with which the virtual object is not equipped, and a user can replace the virtual prop with which the virtual object is equipped through a dragging operation, and can also exchange a position of the virtual prop that is already equipped with.

At present, a wide variety of game programs, such as a shooting game, a roles play game and a real-time strategy game, can be set up and run on a terminal. Taking the shooting game as an example, a virtual object can be equipped with two virtual weapons in a virtual scene of the shooting game, and the two virtual weapons are displayed in different positions in the virtual scene. If positions where the two virtual weapons are displayed are intended to be exchanged, the backpack interface needs to be open, then the positions of the two virtual weapons are exchanged in the backpack interface, and thus the positions where the two virtual weapons are displayed in the virtual scene are exchanged. The above exchanging manner is complicated in operation, a content in the virtual scene may be blocked, and human-computer interaction efficiency is low.

In view of this, an embodiment of this disclosure provides a method for displaying a virtual prop. The method can be executed by a terminal. An implementation environment of the method for displaying the virtual prop provided by one embodiment of this disclosure is introduced below. FIG. 1 is a schematic diagram of an implementation environment of a method for displaying a virtual prop provided by the embodiment of this disclosure. Referring to FIG. 1, the implementation environment includes a terminal 101 and a server 102. The terminal 101 and the server 102 can be connected directly or indirectly in a wired or wireless communication mode, which is not limited here in this disclosure.

In some embodiments, the terminal 101 is a smart phone, a tablet computer, a notebook computer, a desktop computer and the like, but is not limited to these. An application program that supports a virtual scene is set up and runs on the terminal 101. The application program is any one of a first-person shooting game (FPS), a third-person shooting game, a virtual reality application program, a three-dimensional map program or a multiplayer instrument survival game. Schematically, the terminal 101 is a terminal used by a user, the user uses the terminal 101 to operate a virtual object located in the virtual scene to carry out activities, and the activities include but not limited to: at least one of adjusting body postures, crawling, walking, running, riding, jumping, driving, picking up, shooting or throwing. Schematically, the virtual object is a virtual person, such as a simulated persona or a cartoon persona. In an embodiment, there are more or less terminals. For example, there is one, dozens of or hundreds of or even more terminals. The embodiment of this disclosure does not limit the quantity of terminals and a device type.

In some embodiments, the server 102 is a standalone physical server, or a server cluster composed of a plurality of physical servers or a distributed system, or a cloud server providing a cloud service, a cloud database, cloud computing, a cloud function, cloud storage, a network service, cloud communication, a middleware server, a domain name service, a security service, a content delivery network (CDN), big data, an artificial intelligence platform and other basic cloud computing services. The server 102 is configured to provide a background service for the application program that supports the virtual scene. In some embodiments, the server 102 undertakes a primary computing work, and the terminal 101 undertakes a secondary computing work. Or, the server 102 undertakes a secondary computing work, and the terminal 101 undertakes a primary computing work. Or, the server 102 and the terminal 101 use a distributed computing architecture for cooperative computing.

Figure 2:
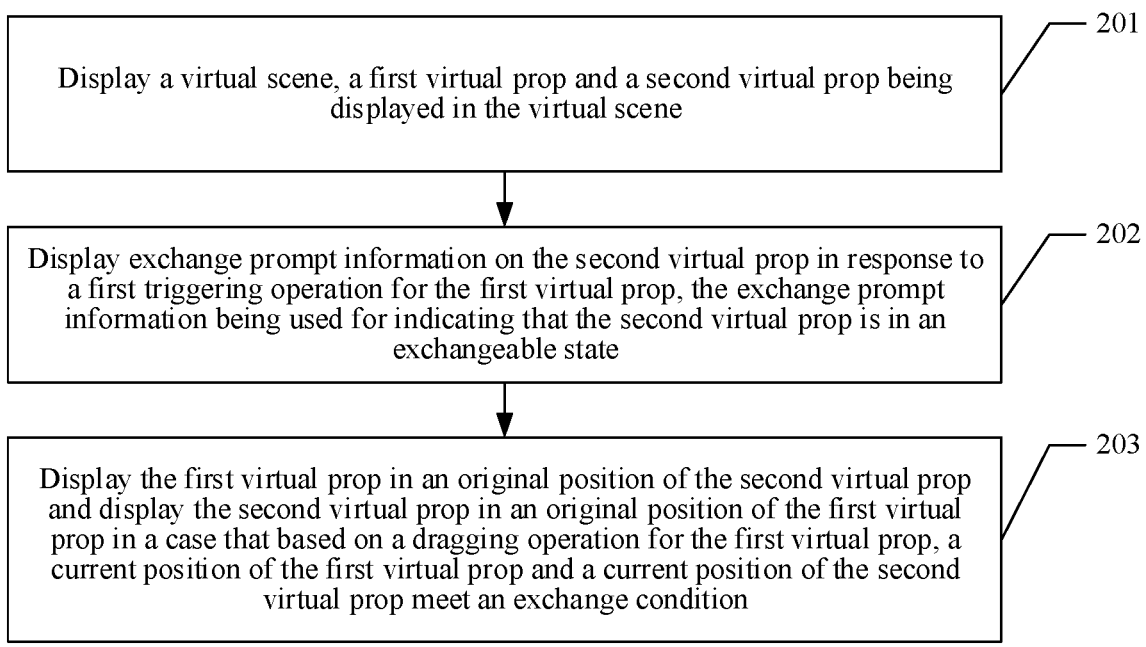
FIG. 2 is a flowchart of a method for displaying a virtual prop provided according to one embodiment of this disclosure.

FIG. 2 is a flowchart of a method for displaying a virtual prop provided according to one embodiment of this disclosure. As shown in FIG. 2, the embodiment of this disclosure makes a description by taking the terminal for executing as an example. The method for displaying the virtual prop includes the following steps:

201: Display, by a terminal, a virtual scene, a first virtual prop and a second virtual prop being displayed in the virtual scene. For example, a virtual scene is displayed, and a first virtual prop and a second virtual prop being are displayed with the virtual scene.

In the embodiment of this disclosure, a controlled virtual object is displayed in the virtual scene, and the first virtual prop and the second virtual prop are virtual weapons with which the controlled virtual object is already equipped.

202: Display, by the terminal, exchange prompt information on the second virtual prop in response to a first triggering operation for the first virtual prop, the exchange prompt information being used for indicating that the second virtual prop is in an exchangeable state. For example, exchange prompt information is displayed on the second virtual prop in response to a first triggering operation for the first virtual prop. The exchange prompt information indicates that the second virtual prop is exchangeable with the first virtual prop.

In the embodiment of this disclosure, a user can execute the first triggering operation for the first virtual prop so as to change the first virtual prop to be in a draggable state, and then the terminal displays the exchange prompt information on the second virtual prop in response to the first triggering operation, so as to prompt the user that the second virtual prop can exchange positions with the first virtual prop.

203: Display, by the terminal, the first virtual prop in an original position of the second virtual prop and display the second virtual prop in an original position of the first virtual prop in a case that based on a dragging operation for the first virtual prop, a current position of the first virtual prop and a current position of the second virtual prop meet an exchange condition. For example, in response to a dragging operation causing a position of the first virtual prop to meet a condition, positions of the first virtual prop and the second virtual prop displayed with the virtual scene are switched.

That is to say, the terminal displays the first virtual prop in the original position of the second virtual prop and displays the second virtual prop in the original position of the first virtual prop in a case that based on the dragging operation for the first virtual prop, the first virtual prop is dragged to a position meeting the exchange condition with the second virtual prop.

In the embodiment of this disclosure, the terminal moves a position of the first virtual prop based on the dragging operation for the first virtual prop, then in a case that the first virtual prop moves to the position meeting the exchange condition, positions of the first virtual prop and the second virtual prop are exchanged, that is, the second virtual prop is displayed in the original position of the first virtual prop, the first virtual prop is displayed in the original position of the second virtual prop, and the original positions are positions where the virtual props are located before dragging.

The embodiment of this disclosure provides a novel method for displaying the virtual prop, by displaying the exchange prompt information on the second virtual prop when the first triggering operation is performed on the first virtual prop, it can be prompted that positions of the first virtual prop and the second virtual prop can be exchanged, and then the positions of the first virtual prop and the second virtual prop can be exchanged by dragging the first virtual prop. As position exchanging can be implemented by dragging the virtual prop, operation is simple, convenient and fast, and human-computer interaction efficiency is high.

Figure 3:
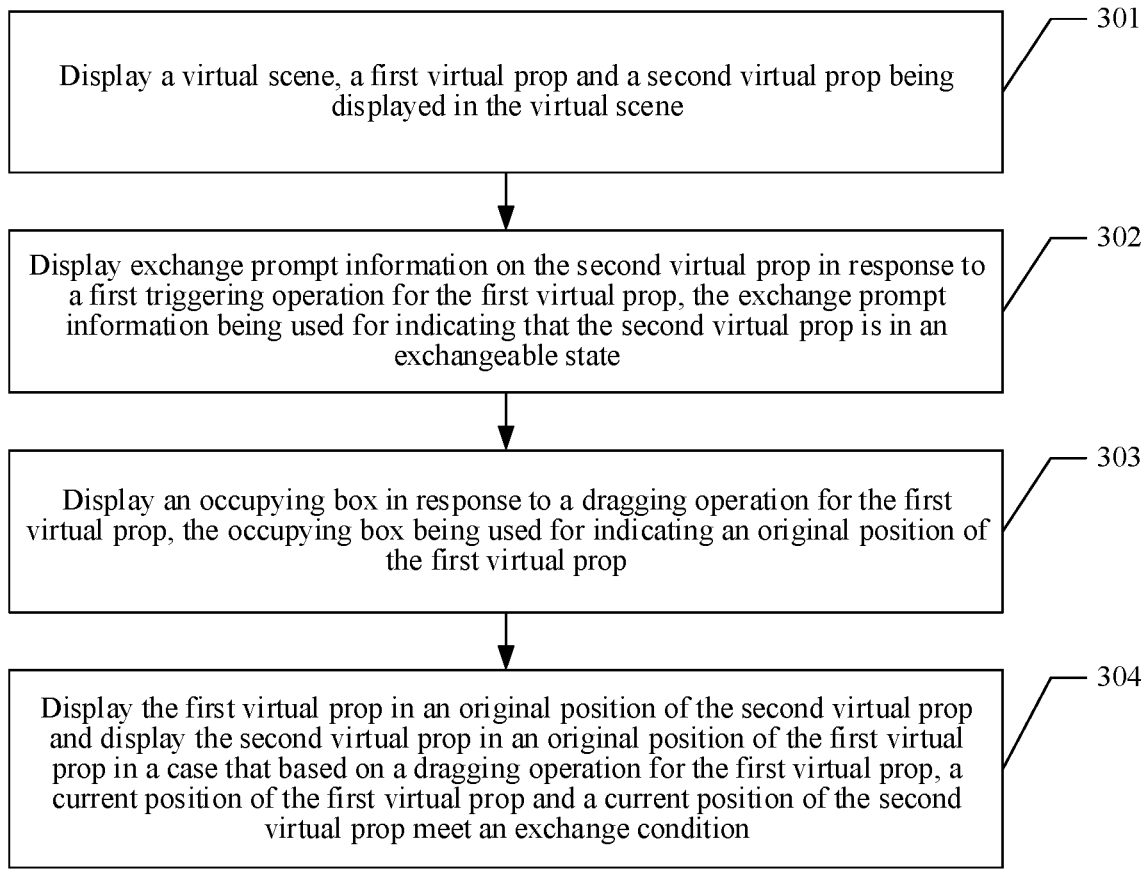
FIG. 3 is a flowchart of another method for displaying a virtual prop provided according to one embodiment of this disclosure.

FIG. 2 exemplarily shows a main flow of the method for displaying the virtual prop above provided by the embodiment of this disclosure. The method for displaying the virtual prop is described in detail below based on an application scene. FIG. 3 is a flowchart of another method for displaying a virtual prop provided according to one embodiment of this disclosure. As shown in FIG. 3, the embodiment of this disclosure makes a description by taking the terminal for executing as an example. The method for displaying the virtual prop includes the following steps:

301: Display, by a terminal, a virtual scene, a first virtual prop and a second virtual prop being displayed in the virtual scene.

In the embodiment of this disclosure, taking the virtual scene being a virtual scene of a shooter game, a controlled virtual object and a plurality of virtual props are displayed in the virtual scene, and the plurality of virtual props are virtual props with which the controlled virtual object is already equipped, or virtual props that can be used by the controlled virtual object. The plurality of above virtual props include the first virtual prop and the second virtual prop, and the embodiment of this disclosure makes a description by taking both the first virtual prop and the second virtual prop being virtual weapons with which the controlled virtual object is already equipped as an example.

In some embodiments, the first virtual prop and the second virtual prop are the same type of virtual props, for example, both the first virtual prop and the second virtual prop are shooting virtual props. Or, the first virtual prop and the second virtual prop are different types of virtual prop, for example, the first virtual prop is a shooting virtual prop, and the second virtual prop is a throwing virtual prop, which is not limited in the embodiment of this disclosure.

Figure 4:
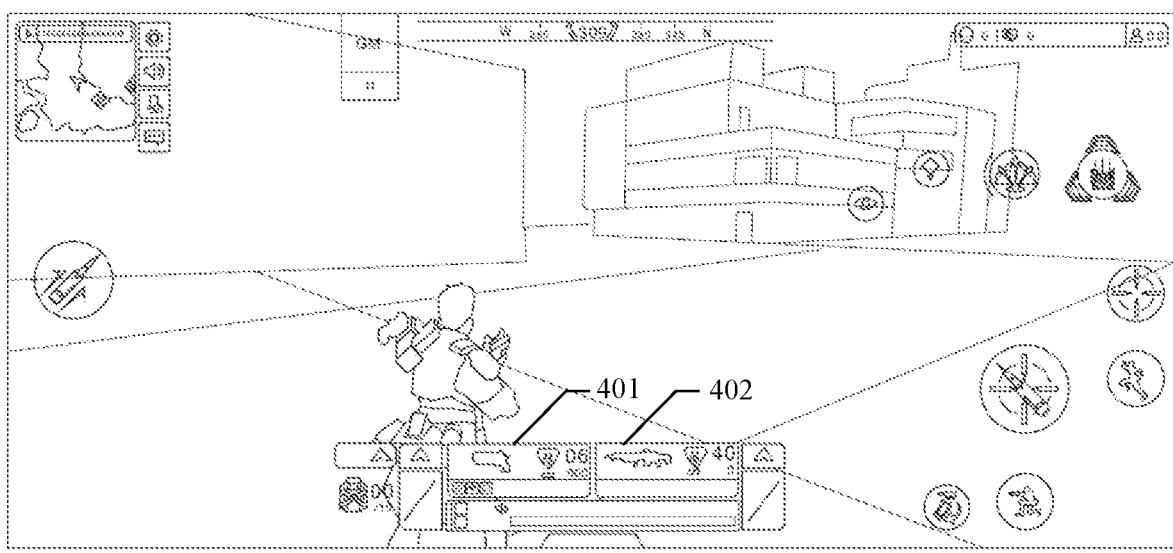
FIG. 4 is a schematic diagram of a virtual scene provided according to one embodiment of this disclosure.

For example, FIG. 4 is a schematic diagram of a virtual scene provided according to one embodiment of this disclosure. Referring to FIG. 4, the first virtual prop 401 and the second virtual prop 402 are displayed in the virtual scene, and both the first virtual prop and the second virtual prop are the virtual weapons with which the controlled virtual object is already equipped. As shown in FIG. 4, the first virtual prop 401 and the second virtual prop 402 are shown in an interface overlaid over the virtual scene. Such overlays may be described herein as being displayed "in the virtual scene" or "with the virtual scene."

In some embodiments, the second virtual prop is a virtual prop with which the controlled virtual object is not equipped, for example, the second virtual prop is a virtual weapon in a backpack of the controlled virtual object. The virtual scene displays the second virtual prop for indicating that the virtual weapon exists in the backpack, but the user cannot use the second virtual prop directly by triggering the second virtual prop, and can use the second virtual prop only after being equipped with the second virtual prop.

The first virtual prop and the second virtual prop are intended to distinguish the different virtual props, and in the embodiment of this disclosure, the virtual prop triggered by the following first triggering operation is the first virtual prop.

302: Display, by the terminal, exchange prompt information on the second virtual prop in response to a first triggering operation for the first virtual prop, the exchange prompt information being used for indicating that the second virtual prop is in an exchangeable state.

In the embodiment of this disclosure, the user can trigger the first virtual prop through the first triggering operation, and the terminal displaying that a first virtual prop floats in response to the first triggering operation for the first virtual prop indicates that the first virtual prop can be dragged freely. In an embodiment, the first triggering operation is a long-press operation, a double-click/tap operation, a slide operation and the like, which is not limited in the embodiment of this disclosure. The terminal displays the exchange prompt information on the second virtual prop when detecting the first triggering operation, so as to prompt the user that the second virtual prop is in an exchangeable state. In an embodiment, the exchange prompt information is displayed in a form of a text, a static picture, a dynamic picture, animation or a dynamic effect. The long-press operation is an operation of pressing for longer than a duration threshold, and the duration threshold is any numerical value greater than 0.

Figure 5:
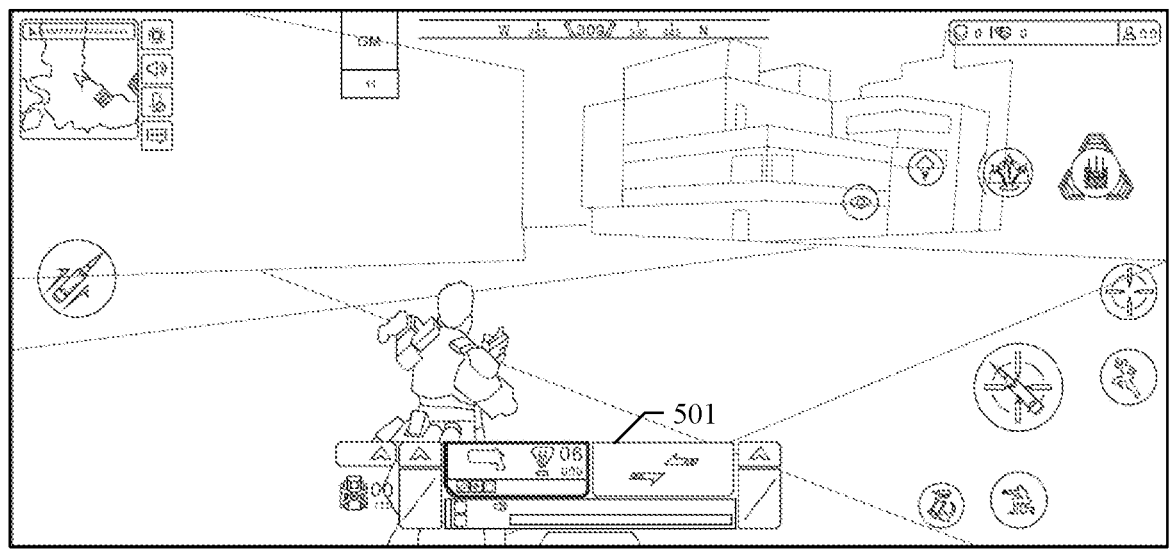
FIG. 5 is a schematic diagram of exchange prompt information provided according to one embodiment of this disclosure.

For example, FIG. 5 is a schematic diagram of exchange prompt information provided according to one embodiment of this disclosure. Referring to FIG. 5, after the user long-presses the first virtual prop, the terminal sets the first virtual prop to be a highlighted state, and the exchange prompt information 501 is displayed on the second virtual prop. The exchange prompt information 501 is a dynamic two-way arrow, that is, the exchange prompt information 501 is displayed on the second virtual prop in a form of a dynamic picture.

In some embodiments, a plurality of virtual props are displayed in the virtual scene, only virtual props having an association (exchange) relationship can exchange their positions, but virtual props without an association relationship cannot exchange their positions. Correspondingly, in response to the first triggering operation for the first virtual prop, the terminal obtains configuration information, the configuration information being used for indicating the second virtual prop associated with the first virtual prop. Then, the terminal displays the exchange prompt information on the second virtual prop based on the configuration information. The second virtual prop associated with the first virtual prop can be accurately determined based on the configuration information by obtaining the configuration information, so that the corresponding exchange prompt information is displayed on the second virtual prop, so as to prompt the user, operation efficiency of the user is improved, and thus human-computer interaction efficiency is improved.

The first virtual prop can be associated with one or a plurality of virtual props, if the plurality of virtual props associated with the first virtual prop are all displayed in the virtual scene, the terminal displays the exchange prompt information on each virtual prop in the plurality of virtual props, so as to prompt which virtual props can exchange positions with the first virtual prop.

In some embodiments, before displaying the exchange prompt information on the second virtual prop, the terminal can further determine whether the second virtual prop can exchange positions. If a current state of the second virtual prop cannot exchange positions, the terminal displays forbidding prompt information on the second virtual prop, the forbidding prompt information being used for indicating that the second virtual prop is in a non-exchangeable state.

For example, in a case that the second virtual prop is not associated with the first virtual prop, the second virtual prop is broken, the second virtual prop has no number of using times or energy of the second virtual prop is not full, the terminal determines that the second virtual prop cannot exchange positions and displays an exchange forbidding picture on the second virtual prop so as to prompt that the second virtual prop cannot exchange positions.

303: Display, by the terminal, an occupying box (an empty box) in response to the dragging operation for the first virtual prop, the occupying box being used for indicating the original position of the first virtual prop.

In the embodiment of this disclosure, in response to the dragging operation for the first virtual prop, the terminal controls the first virtual prop to move with the dragging operation. The terminal can display the occupying box in the original position of the first virtual prop after the first virtual prop is dragged away from the original position by the dragging operation, the occupying box can guarantee that visual stability of interface display, that is, a situation that the original position of the first virtual prop becomes blank after the first virtual prop is dragged, interface attractiveness is affected, and attention of the user is distracted is avoided.

Figure 6:
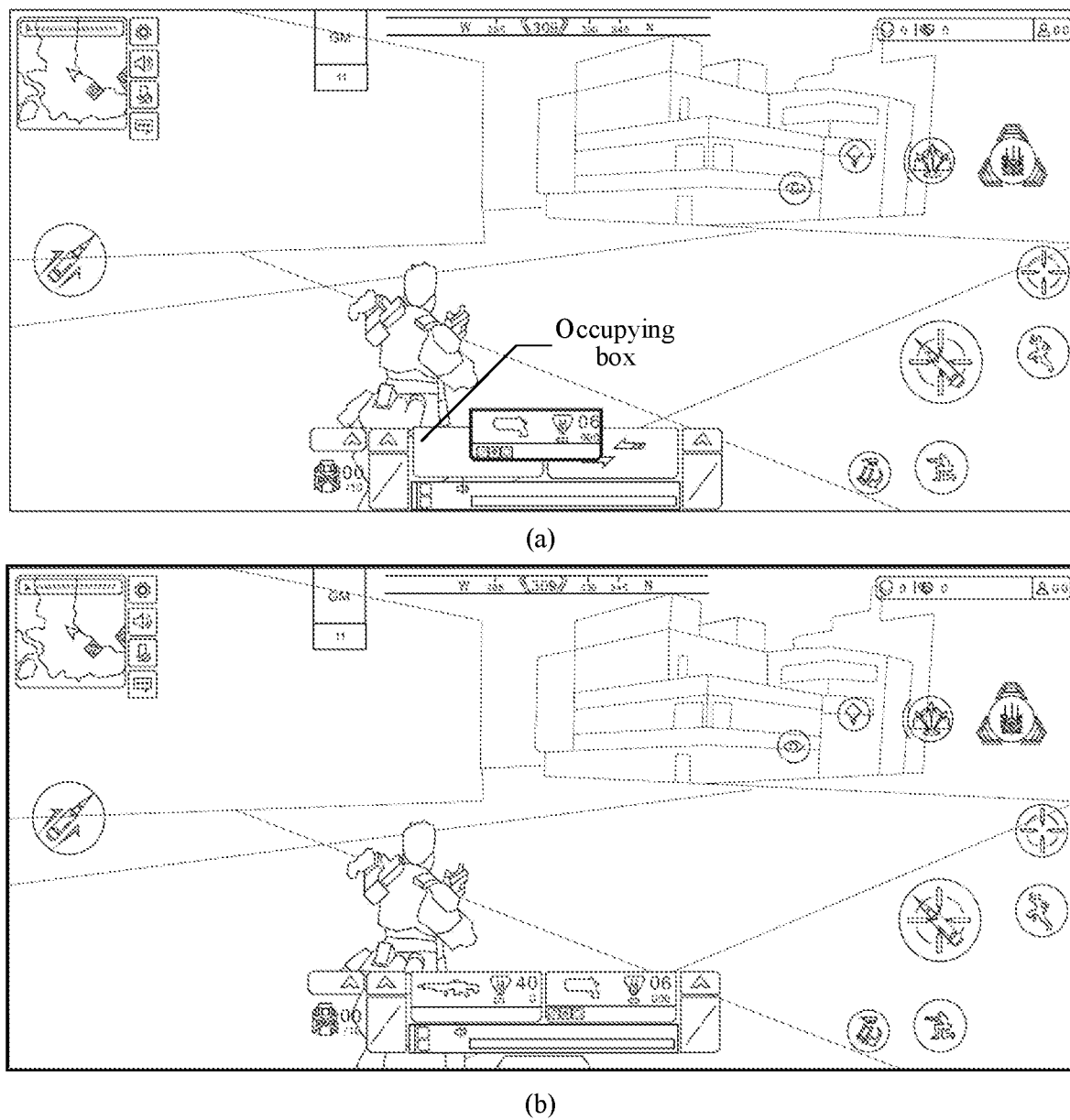
FIG. 6 is a schematic diagram of dragging a first virtual prop provided according to one embodiment of this disclosure.

For example, FIG. 6 is a schematic diagram of dragging a first virtual prop provided according to one embodiment of this disclosure. The terminal drags the first virtual prop to a position shown by (a) in FIG. 6 according to the dragging operation, and the terminal displays the occupying box in the original position of the first virtual prop.

Step 303 may be skipped in some embodiments, that is, the terminal can directly execute the following step 304 after executing step 302.

304: Display, by the terminal, the first virtual prop in an original position of the second virtual prop and display the second virtual prop in an original position of the first virtual prop in a case that based on a dragging operation for the first virtual prop, a current position of the first virtual prop and a current position of the second virtual prop meet an exchange condition.

That is to say, the terminal displays the first virtual prop in the original position of the second virtual prop and displays the second virtual prop in the original position of the first virtual prop in a case that based on the dragging operation for the first virtual prop, the first virtual prop is dragged to a position meeting the exchange condition with the second virtual prop.

In the embodiment of this disclosure, the terminal controls the first virtual prop to move with the dragging operation based on the dragging operation for the first virtual prop, then as the second virtual prop does not move, the terminal can exchange the positions of the first virtual prop and the second virtual prop when the first virtual prop is moved to the position meeting the exchange condition, so that the first virtual prop is displayed in the original position of the second virtual prop and the second virtual prop is displayed in the original position of the first virtual prop.

For example, referring to FIG. 6, the terminal drags the first virtual prop to the position shown by (a) in FIG. 6 according to the dragging operation, the terminal adjusts the positions of the first virtual prop and the second virtual prop in a case of determining that the position meets the exchange condition, and adjusted positions of the first virtual prop and the second virtual prop are shown in by (b) in FIG. 6.

In some embodiments, the terminal can determine whether the exchange condition is met based on an overlapping ratio of the first virtual prop to the second virtual prop. As the first virtual prop moves under control of the dragging operation, the terminal determines the current position of the first virtual prop based on the dragging operation for the first virtual prop, and then the overlapping ratio of the first virtual prop to the second virtual prop is determined in real time based on the current position of the first virtual prop and the current position of the second virtual prop. Afterwards, the terminal displays the first virtual prop in the original position of the second virtual prop and displays the second virtual prop in the original position of the first virtual prop in response to finishing the dragging operation for the first virtual prop in a case that the overlapping ratio is greater than a ratio threshold. The terminal recovers the first virtual prop to the position before dragging, that is, recovers to the original position of the first virtual prop in response to finishing the dragging operation for the first virtual prop in a case that the overlapping ratio is not greater than the ratio threshold.

In some embodiments, the terminal can also determine the overlapping ratio after the dragging operation is finished. Correspondingly, the overlapping ratio of the first virtual prop to the second virtual prop is determined based on the current position of the first virtual prop and the current position of the second virtual prop in response to finishing the dragging operation for the first virtual prop. Afterwards, the terminal displays the first virtual prop in the original position of the second virtual prop and displays the second virtual prop in the original position of the first virtual prop in a case that the overlapping ratio is greater than the ratio threshold. The terminal recovers the first virtual prop to the position before dragging, that is, recovers to the original position of the first virtual prop, in a case that the overlapping ratio is not greater than the ratio threshold.

As the second virtual prop does not move, the current position of the second virtual prop is the original position of the second virtual prop. The above overlapping ratio refers to a ratio for which an area of an overlapping part of the first virtual prop and the second virtual prop account of a total area of the second virtual prop. In an embodiment, the above ratio threshold is any numerical value greater than or equal to 0 and smaller than or equal to 1, for example, the ratio threshold is 0.5, 0.6, 0.7 or the like, which is not limited in the embodiment of this disclosure. Finishing the dragging operation refers to a finger leaving a screen of the terminal.

For example, as shown by (a) in FIG. 6, the first virtual prop is dragged to a position where the first virtual prop overlaps the second virtual prop, the terminal can determine the overlapping ratio when it is detected that the dragging operation is finished, and display the first virtual prop in the original position of the second virtual prop and display the second virtual prop in the original position of the first virtual prop in a case that the overlapping ratio is greater than the ratio threshold.

In some embodiments, the terminal can also determine the overlapping ratio when it is detected that the dragging operation stops but is not finished, and exchange the positions of the first virtual prop and the second virtual prop in a case that dragging is not performed again after the dragging operation stops, and the dragging operation is finished. Correspondingly, the overlapping ratio of the first virtual prop to the second virtual prop is determined based on the current position of the first virtual prop and the current position of the second virtual prop in response to stopping the dragging operation for the first virtual prop. In response to finishing the dragging operation, in a case that the overlapping ratio is greater than the ratio threshold, the first virtual prop is displayed in the original position of the second virtual prop and the second virtual prop is displayed in the original position of the first virtual prop. In a case that the overlapping ratio is not greater than the ratio threshold, the first virtual prop is recovered to the position before dragging, that is, the first virtual prop is recovered to the original position of the first virtual prop. Stopping the dragging operation refers to that a finger does not move on the screen of the terminal any more, but does not leave the screen of the terminal.

In some embodiments, the terminal can also determine the overlapping ratio when it is detected that the dragging operation stops but is not finished, and exchange the positions of the first virtual prop and the second virtual prop in a case that dragging is not performed again after the dragging operation stops, and the dragging operation is finished. Correspondingly, the overlapping ratio of the first virtual prop to the second virtual prop is determined based on the current position of the first virtual prop and the current position of the second virtual prop in response to stopping the dragging operation for the first virtual prop. In a case that the overlapping ratio is greater than the ratio threshold, the second virtual prop is displayed in the original position of the first virtual prop, and in response to finishing the dragging operation, the first virtual prop is displayed in the original position of the second virtual prop. In a case that the overlapping ratio is not greater than the ratio threshold, in response to finishing the dragging operation, the first virtual prop is recovered to the position before dragging, that is, the first virtual prop is recovered to the original position of the first virtual prop. Before finishing the dragging operation, if the second virtual prop is already displayed in the original position of the first virtual prop and it is detected again that the overlapping ratio of the first virtual prop to the second virtual prop is greater than the ratio threshold, the second virtual prop is recovered to the original position of the second virtual prop. By displaying the second virtual prop in the original position of the first virtual prop before finishing the dragging operation, the user can timely check whether exchange can be implemented and an effect after exchange is implemented, and the virtual props can be exchanged back during the dragging operation, so that exchange mistakes are prevented, and the human-computer interaction efficiency is improved.

Figure 7:
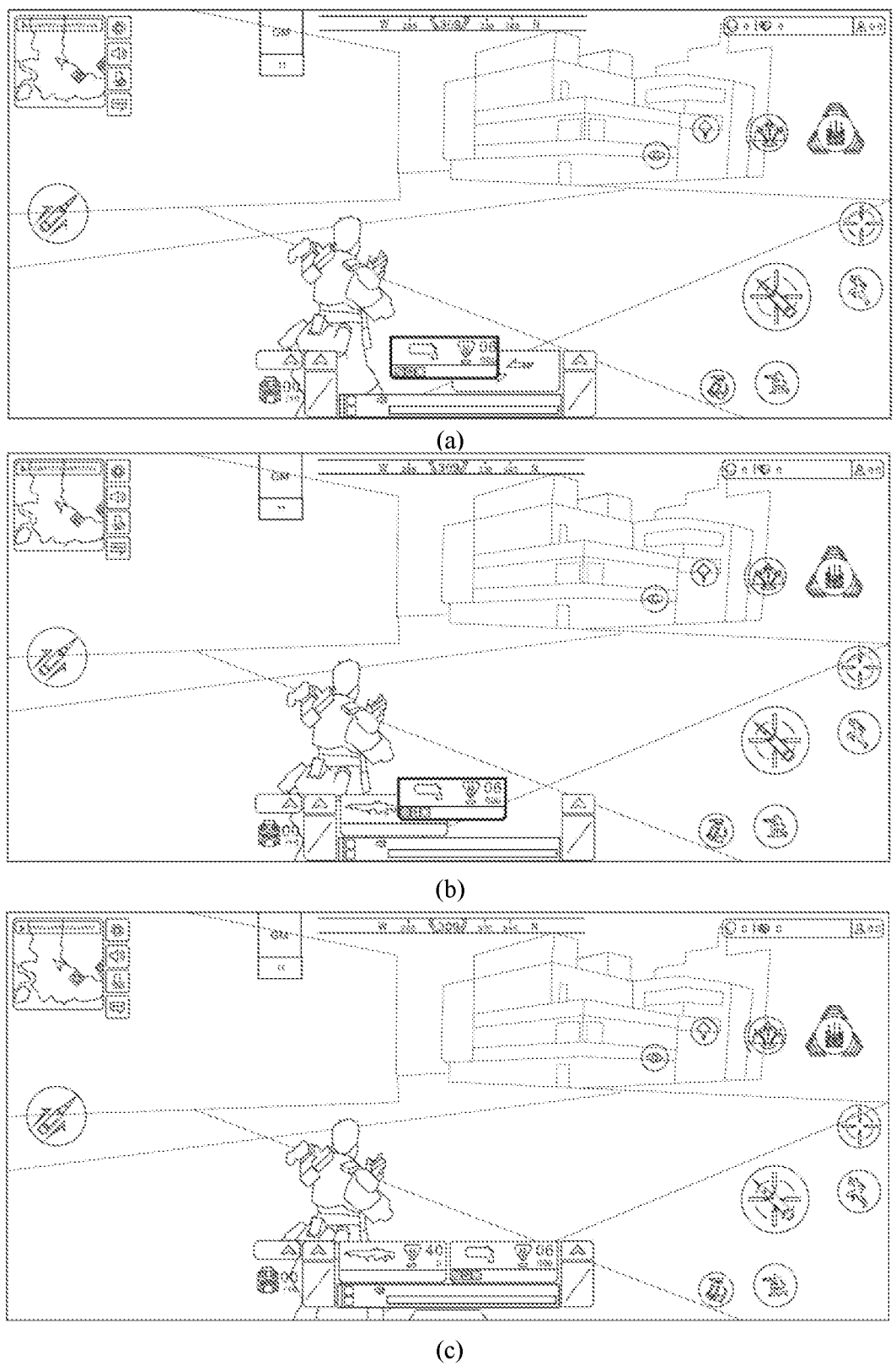
FIG. 7 is another schematic diagram of dragging a first virtual prop provided according to one embodiment of this disclosure.

For example, FIG. 7 is another schematic diagram of dragging a first virtual prop provided according to one embodiment of this disclosure. Referring to FIG. 7, the terminal drags the first virtual prop to the position shown by (a) in FIG. 7 according to the dragging operation. In a case that the terminal determines that the position meets the exchange condition, that is, the overlapping ratio of the first virtual prop to the second virtual prop is greater than the ratio threshold, the terminal displays the second virtual prop in the original position of the first virtual prop and the current position of the first virtual prop remains, as shown by (b) in FIG. 7. When it is detected that the dragging operation is finished, the terminal displays the first virtual prop in the original position of the second virtual prop, as shown by (c) in FIG. 7.

The above process shows a manner of exchanging the positions of the first virtual prop and the second virtual prop after the dragging operation for the first virtual prop is finished. In some embodiments, the terminal does not need to detect whether the dragging operation is finished, the current position of the first virtual prop is determined in real time in a process of implementing the dragging operation by the user, the overlapping ratio of the first virtual prop to the second virtual prop is determined in real time based on the current position of the first virtual prop and the current position of the second virtual prop, and once it is detected that the overlapping ratio is greater than the ratio threshold, the first virtual prop is displayed in the original position of the second virtual prop, and the second virtual prop is displayed in the original position of the first virtual prop. In this way, it can be presented that the first virtual prop moves with dragging by the user, when the exchange condition is met, the first virtual prop is automatically attracted to the original position of the second virtual prop, and meanwhile, the second virtual prop is switched from its own original position to the original position of the first virtual prop, so the user can trigger the virtual props for position exchanging without loosening hands. Thus, the human-computer interaction efficiency is improved.

In some embodiments, a first prop box and a second prop box are displayed in the virtual scene, the first virtual prop is displayed in the first prop box, the second virtual prop is displayed in the second prop box, and the prop boxes can move with the virtual props. Correspondingly, in response to the dragging operation for the first virtual prop, the terminal displays that the first prop box moves with the first virtual prop when the first virtual prop moves under control of the dragging operation. Based on the current position of the first virtual prop and the current position of the second virtual prop, the terminal determines an overlapping ratio of the first prop box to the second prop box as the overlapping ratio of the first virtual prop to the second virtual prop.

For example, the terminal can determine an overlapping area of an overlapping part of the first prop box and the second prop box and then determines a ratio for which the overlapping area accounts of a total area of the second prop box as the overlapping ratio.

In some embodiments, the terminal can determine whether the exchange condition is met based on whether the first virtual prop moves into an exchange range of the second virtual prop. Correspondingly, the current position of the first virtual prop is determined based on the dragging operation for the first virtual prop, for example, the terminal determines the current position of the first virtual prop in response to finishing the dragging operation for the first virtual prop. Afterwards, in a case that the current position of the first virtual prop is located within the exchange range of the second virtual prop, the terminal displays the first virtual prop in the original position of the second virtual prop and displays the second virtual prop in the original position of the first virtual prop, and the exchange range is determined based on the current position of the second virtual prop. In an embodiment, the exchange range is a region around the second virtual prop, and the embodiment of this disclosure does not limit a size of the exchange range.

Figure 8:
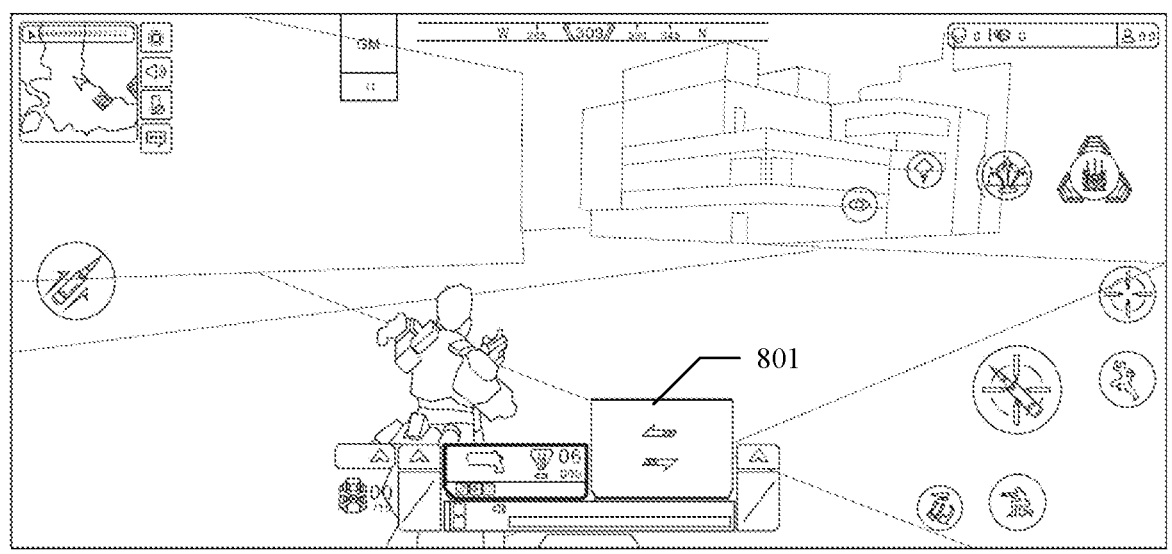
FIG. 8 is a schematic diagram of an exchange range provided according to one embodiment of this disclosure.

For example, FIG. 8 is a schematic diagram of an exchange range provided according to one embodiment of this disclosure. Referring to FIG. 8, the exchange range is a rectangular region 801 around the second virtual prop, and the exchange prompt information is displayed in the rectangular region 801. Certainly, the exchange range may also be a round region, or a region with a larger area.

Figure 9:
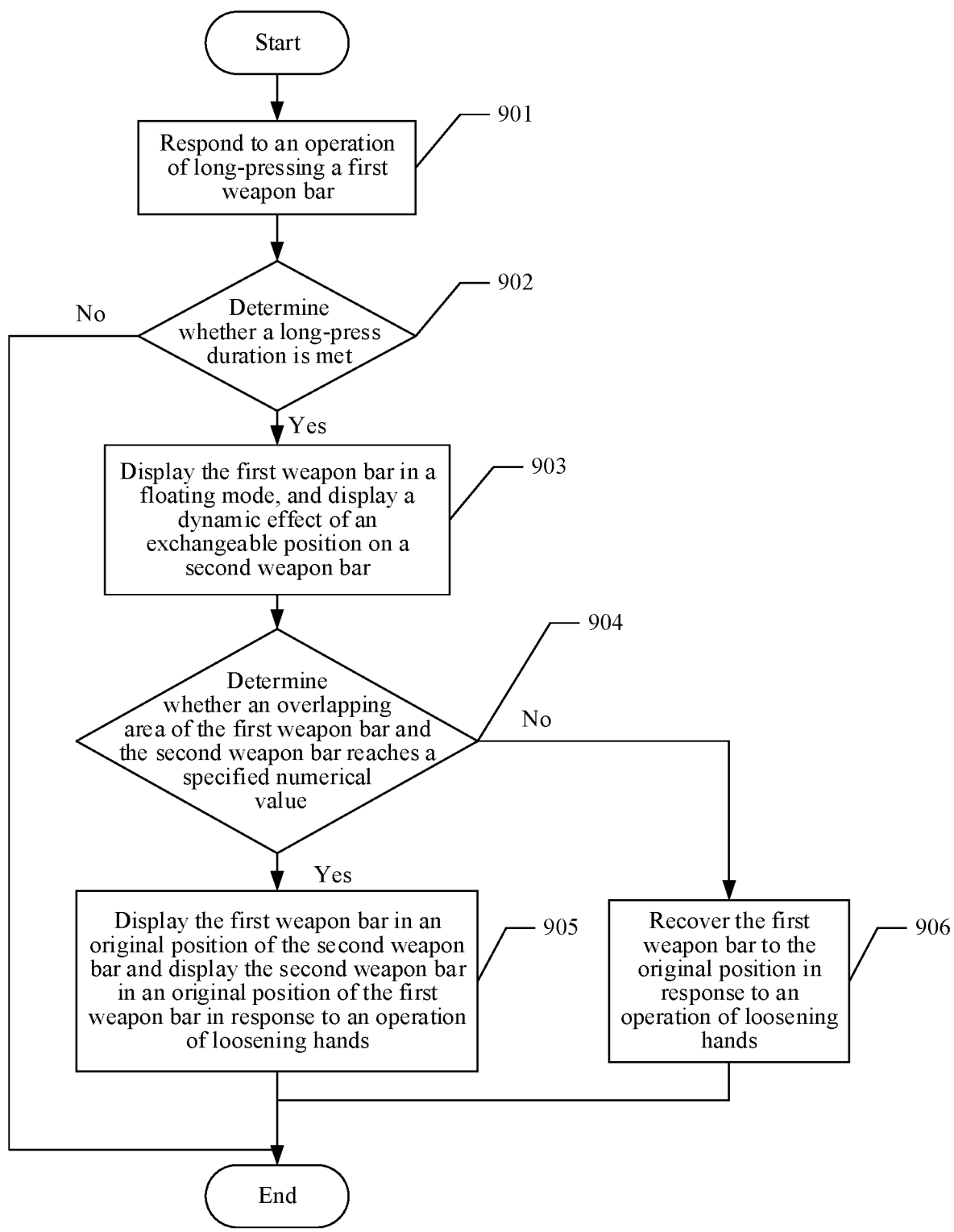
FIG. 9 is a flowchart of another method for displaying a virtual prop provided according to one embodiment of this disclosure.

In order to make the method for displaying the virtual prop described in above step 301 to step 304 easier to understand, referring to FIG. 9, FIG. 9 is a flowchart of another method for displaying a virtual prop provided according to one embodiment of this disclosure. The method for displaying the virtual prop includes the following steps: 901: Respond to an operation of long-pressing a first weapon bar; 902: Determine whether a long-press duration is met, and execute step 903 in a case that the long-press duration is met; 903: Display the first weapon bar in a floating mode, and display a dynamic effect of an exchangeable position on a second weapon bar; 904: Determine whether an overlapping area of the first weapon bar and the second weapon bar reaches a specified numerical value, if yes, execute 905, otherwise, execute 906; 905: Display the first weapon bar in an original position of the second weapon bar and display the second weapon bar in an original position of the first weapon bar in response to an operation of loosening hands; and 906: Recover the first weapon bar to the original position in response to an operation of loosening hands.

If the second virtual prop is a virtual prop with which the controlled virtual object is not equipped, that is, the second virtual prop is a prop existing in a backpack of the controlled virtual object, the terminal can further control the controlled virtual object to be equipped with the second virtual prop and unequipped with the first virtual prop after displaying the first virtual prop in the original position of the second virtual prop and displaying the second virtual prop in the original position of the first virtual prop. Correspondingly, after the user opens a backpack interface of the controlled virtual object, the first virtual prop is displayed in a region where unequipped virtual props are located, and the second virtual prop is displayed in a region where equipped virtual props are located.

Step 301 to step 304 are example implementations of the method for displaying the virtual prop provided by the embodiment of this disclosure, and the method for displaying the virtual prop can also be implemented in other manners. In some embodiments, the first virtual prop and the second virtual prop are displayed in a prop show region (or prop region) displayed with the virtual scene, in response to detecting a second triggering operation in the prop show region, the terminal displays the first virtual prop in the original position of the second virtual prop and displays the second virtual prop in the original position of the first virtual prop. The second triggering operation includes a slide operation, a continuous-click/tap operation, a multi-finger operation and the like.

For example, the terminal detects the slide operation from left to right in the prop show region, or detects a slide operation from right to left, so the first virtual prop is displayed in the original position of the second virtual prop and the second virtual prop is displayed in the original position of the first virtual prop.

For another example, the terminal detects the continuous-click/tap operation such as a double-click/tap operation or a triple-click/tap operation in the prop show region, the first virtual prop is displayed in the original position of the second virtual prop and the second virtual prop is displayed in the original position of the first virtual prop.

For yet another example, the terminal detects the multi-finger operation such as a double-finger click/tap operation, a double-finger slide operation, a triple-finger click/tap operation and a triple-finger slide operation in the prop show region, the first virtual prop is displayed in the original position of the second virtual prop and the second virtual prop is displayed in the original position of the first virtual prop.

In some embodiments, a prop exchange control is further displayed in the virtual scene and used for exchanging the positions of the first virtual prop and the second virtual prop. In response to a triggering operation for the prop exchange control, the first virtual prop is displayed in the original position of the second virtual prop and the second virtual prop is displayed in the original position of the first virtual prop. The user can exchange the positions of the first virtual prop and the second virtual prop again by triggering the prop exchange control again, that is, in response to performing triggering operation for the prop exchange control again, the terminal displays the first virtual prop in the original position of the first virtual prop and displays the second virtual prop in the original position of the second virtual prop.

The embodiment of this disclosure provides a novel method for displaying the virtual prop, by displaying the exchange prompt information on the second virtual prop when the first triggering operation is performed on the first virtual prop, it can be prompted that positions of the first virtual prop and the second virtual prop can be exchanged, and then the positions of the first virtual prop and the second virtual prop can be exchanged by dragging the first virtual prop. As position exchanging can be implemented by dragging the virtual prop, operation is simple, convenient and fast, and human-computer interaction efficiency is high.

Figure 10:
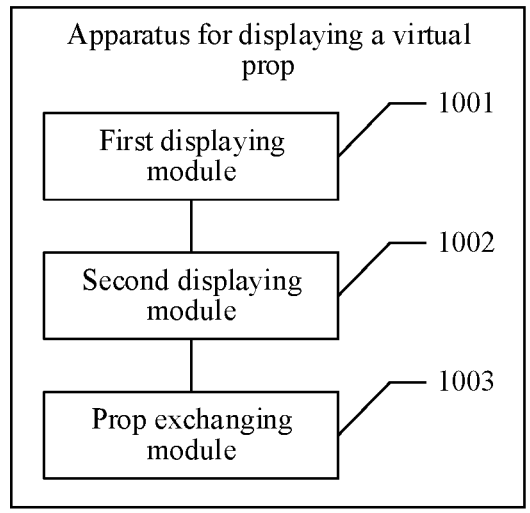
FIG. 10 is a block diagram of an apparatus for displaying a virtual prop provided according to one embodiment of this disclosure.

FIG. 10 is a block diagram of an apparatus for displaying a virtual prop provided according to one embodiment of this disclosure. The apparatus is configured to execute the steps in the above method for displaying the virtual prop. Referring to FIG. 10, the apparatus includes: a first displaying module 1001, a second displaying module 1002 and a prop exchanging module 1003.

The first displaying module 1001 is configured to display a virtual scene, a first virtual prop and a second virtual prop being displayed in the virtual scene;

the second displaying module 1002 is configured to display exchange prompt information on the second virtual prop in response to a first triggering operation for the first virtual prop, the exchange prompt information being used for indicating that the second virtual prop is in an exchangeable state; and the prop exchanging module 1003 is configured to display the first virtual prop in an original position of the second virtual prop and display the second virtual prop in an original position of the first virtual prop in a case that based on a dragging operation for the first virtual prop, a current position of the first virtual prop and a current position of the second virtual prop meet an exchange condition. In other words, the prop exchanging module 1003 is configured to display the first virtual prop in the original position of the second virtual prop and display the second virtual prop in the original position of the first virtual prop in a case that based on the dragging operation for the first virtual prop, the first virtual prop is dragged to a position meeting an exchange condition with the second virtual prop.

Figure 11:
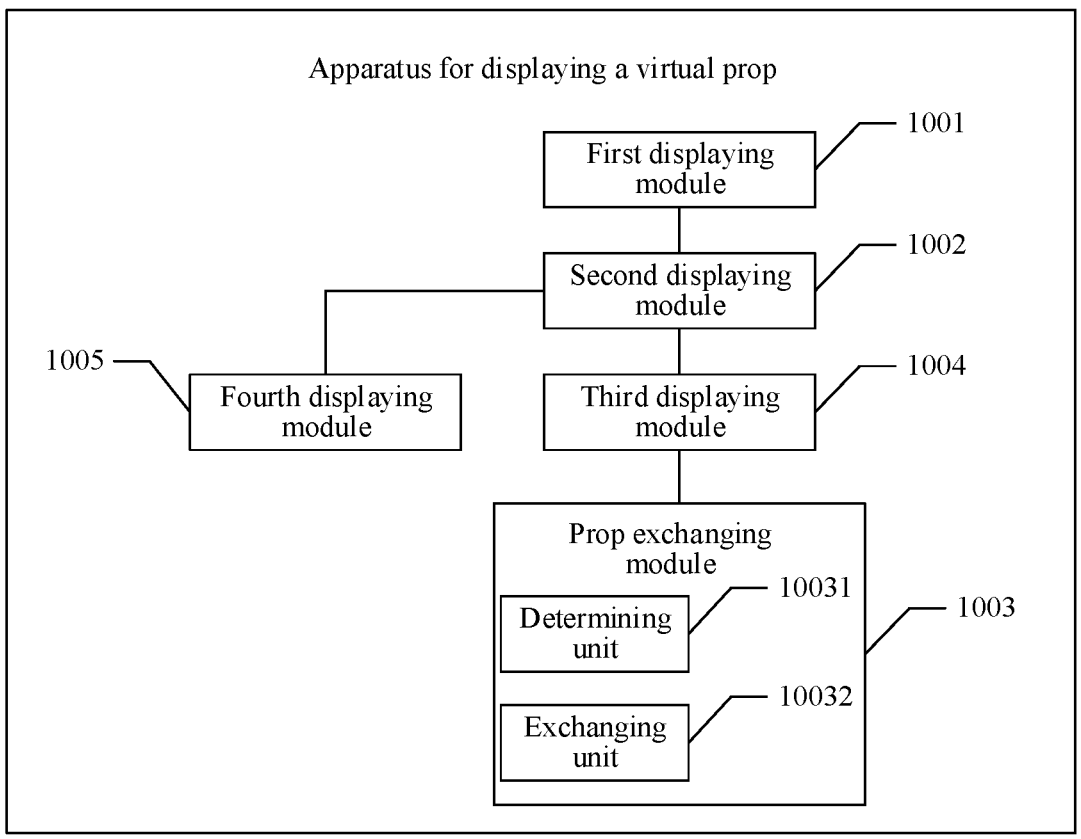
FIG. 11 is a block diagram of another apparatus for displaying a virtual prop provided according to one embodiment of this disclosure.

In some embodiments, FIG. 11 is a block diagram of another apparatus for displaying a virtual prop provided according to one embodiment of this disclosure. Referring to FIG. 11, the prop exchanging module 1003 includes:

a determining unit 10031, configured to determine an overlapping ratio of the first virtual prop to the second virtual prop based on the current position of the first virtual prop and the current position of the second virtual prop in response to finishing the dragging operation for the first virtual prop. In other words, the determining unit 10031 is configured to determine an overlapping ratio of the first virtual prop to the second virtual prop based on the current position of the first virtual prop determined through the dragging operation and the current position of the second virtual prop; and an exchanging unit 10032, configured to display the first virtual prop in the original position of the second virtual prop and display the second virtual prop in the original position of the first virtual prop in a case that the overlapping ratio is greater than a ratio threshold.

In some embodiments, the first virtual prop is displayed in a first prop box, and the second virtual prop is displayed in a second prop box. Referring to FIG. 11, the apparatus further includes:

a third displaying module 1004, configured to display that the first prop box moves with the first virtual prop in a case that the first virtual prop moves under control of the dragging operation in response to the dragging operation for the first virtual prop.

The determining unit 10031 is configured to determine, based on the current position of the first virtual prop and the current position of the second virtual prop, an overlapping ratio of the first prop box to the second prop box as the overlapping ratio of the first virtual prop to the second virtual prop.

In some embodiments, the exchanging unit 10032 is further configured to recover the first virtual prop to the original position before dragging in a case that the overlapping ratio is not greater than the ratio threshold.

In some embodiments, referring to FIG. 11, the prop exchanging module 1003 includes:

a determining unit 10031, configured to determine a current position of the first virtual prop in response to finishing the dragging operation for the first virtual prop. In other words, the determining unit 10031 is configured to determine the current position of the first virtual prop based on the dragging operation for the first virtual prop.

The exchanging unit 10032 is configured to display the first virtual prop in the original position of the second virtual prop and display the second virtual prop in the original position of the first virtual prop in a case that the current position of the first virtual prop is located within an exchange range of the second virtual prop, the exchange range being determined based on a current position of the second virtual prop.

In some embodiments, the second displaying module 1002 is configured to obtain configuration information in response to the first triggering operation for the first virtual prop, the configuration information being used for indicating the second virtual prop associated with the first virtual prop; and display the exchange prompt information on the second virtual prop based on the configuration information.

In some embodiments, referring to FIG. 11, the apparatus further includes: a fourth displaying module 1005, configured to display an occupying box in response to the dragging operation for the first virtual prop, the occupying box being used for indicating the original position of the first virtual prop.

In some embodiments, the first virtual prop and the second virtual prop are displayed in a prop show region in the virtual scene. The prop exchanging module 1003 is further configured to display the first virtual prop in the original position of the second virtual prop and display the second virtual prop in the original position of the first virtual prop in response to detecting a second triggering operation in the prop show region.

In some embodiments, the second triggering operation includes: a slide operation, a continuous-click/tap operation or a multi-finger operation.

In some embodiments, a prop exchange control is further displayed in the virtual scene and used for exchanging the positions of the first virtual prop and the second virtual prop. The prop exchange control 1003 is further configured to display the first virtual prop in the original position of the second virtual prop and display the second virtual prop in the original position of the first virtual prop in response to a triggering operation for the prop exchange control.

The embodiment of this disclosure provides the apparatus for displaying the virtual prop, by displaying the exchange prompt information on the second virtual prop when the first triggering operation is performed on the first virtual prop, it can be prompted that positions of the first virtual prop and the second virtual prop can be exchanged, and then the positions of the first virtual prop and the second virtual prop can be exchanged by dragging the first virtual prop. As position exchanging can be implemented by dragging the virtual prop, the operation is simple, convenient and fast, and the human-computer interaction efficiency is high.

When the apparatus for displaying the virtual prop provided by the above embodiments displays the virtual prop, dividing of the above functional modules are taken as an example for description, and in actual application, the above functions are completed by different functional modules according to demands, that is, an internal structure of the apparatus is divided into the different functional modules so as to complete all or part of the functions described above. Besides, the apparatus for displaying the virtual prop provided by the above embodiment and the embodiment of the method for displaying the virtual prop belong to the same concept, and a specific implementation process refers to the details of the method embodiment and is not described in detail here.

Figure 12:
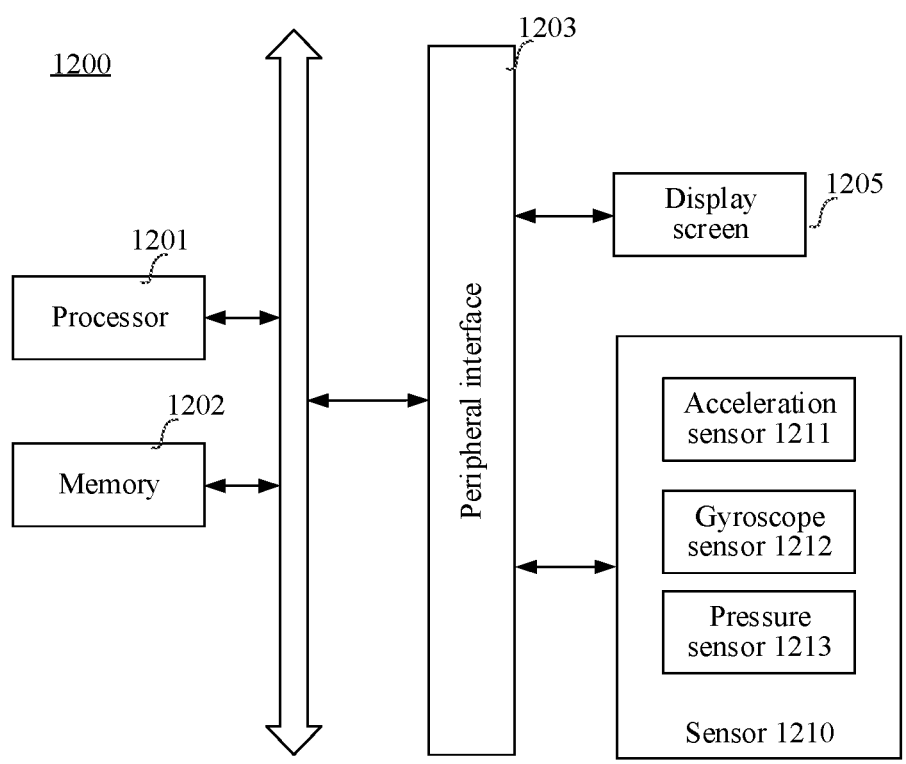
FIG. 12 is a structural block diagram of a terminal provided according to one embodiment of this disclosure.

FIG. 12 is a structural block diagram of a terminal 1200 provided according to one embodiment of this disclosure. In an embodiment, the terminal 1200 is a potable mobile terminal, such as: a smart phone, a tablet computer, a moving picture experts group audio layer III (MP3) player, a moving picture experts group audio layer IV (MP4) player, a notebook computer or a desktop computer. The terminal 1200 may also be referred to as another name such as user equipment, a portable terminal, a laptop terminal, or a desktop terminal.

In general, the terminal 1200 includes: a processor 1201 (processing circuitry) and a memory 1202 (a non-transitory computer-readable storage medium).

The processor 1201 includes one or more processing cores, for example, a 4-core processor, an 8-core processor and the like. The processor 1201 is implemented in at least one hardware form of digital signal processing (DSP), a field-programmable gate array (FPGA) or a programmable logic array (PLA). In an embodiment, the processor 1201 includes a main processor and a co-processor, the main processor is a processor configured to process data in a wake-up state, which is also called a central processing unit (CPU). The co-processor is a low-power-consumption processor configured to process data in a stand-by state. In some embodiments, the processor 1201 is integrated with a graphics processing unit (GPU), and the GPU is configured to be responsible for rendering and drawing of a content that needs to be displayed by a display screen. In some embodiments, the processor 1201 further includes an artificial intelligence (AI) processor. The AI processor is configured to process a computing operation related to machine learning.

The memory 1202 includes one or more computer-readable storage media, and the computer-readable storage medium is non-transitory. The memory 1202 may further include a high-speed random access memory and a nonvolatile memory, for example, one or more disk storage devices or flash storage devices. In some embodiments, the non-transitory computer-readable storage medium in the memory 1202 is configured to store at least one computer program. The at least one computer program is configured to be executed by the processor 1201 to implement the method for displaying the virtual prop provided by the method embodiment in this disclosure.

In some embodiments, the terminal 1200 may further include: a peripheral interface 1203 and at least one peripheral device. The processor 1201, the memory 1202 and the peripheral interface 1203 are connected through a bus or a signal line. All peripheral devices are connected with the peripheral interface 1203 through a bus, a signal line or a circuit board. In an embodiment, the peripheral device includes: a display screen 1205.

The peripheral interface 1203 may be configured to connect the at least one peripheral device related to input/output (I/O) to the processor 1201 and the memory 1202. In some embodiments, the processor 1201, the memory 1202 and the peripheral interface 1203 are integrated on the same chip or circuit board. In some other embodiments, any one or any two of the processor 1201, the memory 1202 and the peripheral interface 1203 is/are implemented on a separate chip or circuit board, which is not limited in the embodiment.

The display screen 1205 is configured to display a user interface (UI). The UI includes graphics, texts, icons, videos and any combination of them. When the display screen 1205 is a touch display screen, the display screen 1205 further has a capability of collecting a touch signal on or above a surface of the display screen 1205. The touch signal serves as a control signal to be input into the processor 1201 for processing. At this moment, the display screen 1205 is further configured to provide a virtual button and/or a virtual keyboard, also called a soft button and/or a soft keyboard. In some embodiments, there is one display screen 1205 which is arranged on a front panel of the terminal 1200. In some other embodiments, there are at least two display screens 1205 which are arranged on different surfaces of the terminal 1200 or designed in a folded mode respectively. In some other embodiments, the display screen 1205 is a flexible display screen which is arranged on a bent surface or a folded surface of the terminal 1200. Or even, the display screen 1205 is further arranged into a non-rectangular irregular shape, that is, a special-shaped screen. The display screen 1205 is prepared by using materials such as a liquid crystal display (LCD) or an organic light-emitting diode (OLED).

In some embodiments, the terminal 1200 further includes one or more sensors 1210. The one or more sensors 1210 include but not limited to: an acceleration sensor 1211, a gyroscope sensor 1212 and a pressure sensor 1213.

The acceleration sensor 1211 is configured to detect a magnitude of acceleration on three coordinate axes of a coordinate system established with the terminal 1200. For example, the acceleration sensor 1211 is configured to detect a component of a gravitational acceleration on the three coordinate axes. The processor 1201 controls the display screen 1205 to display the user interface in a landscape view or a portrait view according to a gravitational acceleration signal collected by the acceleration sensor 1211. The acceleration sensor 1211 is further configured to collect motion data of a game or a user.

The gyroscope sensor 1212 is configured to detect a body direction and a turning angle of the terminal 1200, and the gyroscope sensor 1212 and the acceleration sensor 1211 cooperatively collect 3D actions of the user for the terminal 1200. According to data collected by the gyroscope sensor 1212, the processor 1201 implements the following functions: action sensing (for example, the UI is changed according to a tilting operation of the user), image stabilizing during shooting, game control and inertial navigation.

The pressure sensor 1213 is arranged on a side frame of the terminal 1200 and/or a lower layer of the display screen 1205. When the pressure sensor 1213 is arranged on the side frame of the terminal 1200, a holding signal of the user for the terminal 1200 is detected, and the processor 1201 performs left hand and right hand recognition or a shortcut operation according to the holding signal collected by the pressure sensor 1213. When the pressure sensor 1213 is arranged on the lower layer of the display screen 1205, the processor 1201 implements control over an operable control on the UI according to a pressure operation for the display screen 1205 by the user. The operable control includes at least one of a button control, a scroll-bar control, an icon control, or a menu control.

A person skilled in the art can understand that a structure shown in FIG. 12 does not constitute a limitation on the terminal 1200, and the terminal 1200 includes more or less components than shown in the figure, or combines some components, or is arranged by using different components.

An embodiment of this disclosure further provides a computer-readable storage medium, the computer-readable storage medium stores at least one computer program, and the at least one computer program is loaded and executed by a processor of a terminal to implement operations executed by the terminal in the method for displaying the virtual prop in the above embodiments. For example, the computer-readable storage medium is a read-only memory (ROM), a random access memory (RAM), a compact disc read-only memory (CD-ROM), a magnetic tape, a floppy disk, an optical data storage device and the like.

In some embodiments, the computer program involved in the embodiment of this disclosure may be deployed on one terminal to be executed, or executed on a plurality of terminals located on the same place, or executed on a plurality of terminals distributed in a plurality of places and interconnected through a communication network, and the plurality of terminals distributed in the plurality of places and interconnected through the communication network constitute a blockchain system.

An embodiment of this disclosure further provides a computer program product. The computer program product includes computer program code. The computer program code is stored in the computer readable storage medium. A processor of a terminal reads the computer program code from the computer readable storage medium and executes the computer program code, such that the terminal executes the method for displaying the virtual prop provided in the above various example implementations.

A person ordinarily skilled in the art can understand that implementing all or part of steps in the above embodiment is completed by hardware, or completed by hardware related to instructions through a program, the program is stored in a computer readable storage medium, and the above mentioned storage medium is a read-only memory, a magnetic disk, a compact disc or the like.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A method for displaying a virtual prop, the method comprising:
    displaying a virtual scene, a first virtual prop and a second virtual prop being displayed with the virtual scene;
    displaying exchange prompt information on the second virtual prop in response to a first triggering operation for the first virtual prop, the exchange prompt information indicating that the second virtual prop is exchangeable with the first virtual prop; and
    in response to a dragging operation causing a position of the first virtual prop to meet a condition, switching positions of the first virtual prop and the second virtual prop displayed with the virtual scene.

2. The method according to claim 1, wherein the switching comprises:
    during the dragging operation, determining an overlapping ratio of the first virtual prop to the second virtual prop; and
    in response to the overlapping ratio being greater than a threshold, switching the positions of the first virtual prop and the second virtual prop displayed with the virtual scene.

3. The method according to claim 2, wherein
    the first virtual prop is displayed in a first prop box displayed with the virtual scene, and the second virtual prop is displayed in a second prop box displayed with the virtual scene;
    the method further comprises displaying that the first prop box moves with the first virtual prop during the dragging operation; and
    the determining the overlapping ratio comprises:
        determining, based on the moved position of the first prop box during to the dragging operation, an overlapping ratio of the first prop box to the second prop box as the overlapping ratio of the first virtual prop to the second virtual prop.

4. The method according to claim 2, further comprising:
    displaying the first virtual prop to its original position before the dragging operation in response to a determination that the overlapping ratio is not greater than the threshold.

5. The method according to claim 1, wherein the switching comprises:
    during the dragging operation, determining a current position of the first virtual prop with respect to the second virtual prop; and
    in response to the current position of the first virtual prop being within an exchange range of the second virtual prop, switching the positions of the first virtual prop and the second virtual prop displayed with the virtual scene.

6. The method according to claim 1, wherein the displaying the exchange prompt information comprises:
    obtaining configuration information in response to the first triggering operation for the first virtual prop, the configuration information indicating the second virtual prop exchangeable with the first virtual prop; and
    displaying the exchange prompt information on the second virtual prop based on the configuration information.

7. The method according to claim 1, further comprising:
    displaying an empty box in response to the dragging operation moving the first virtual prop, the empty box indicating an original position of the first virtual prop prior to the dragging operation.

8. The method according to claim 1, wherein
the first virtual prop and the second virtual prop are displayed in a prop region with the virtual scene; and
the method further comprises:
in response to detecting a second triggering operation in the prop region, switching the positions of the first virtual prop and the second virtual prop in the prop region.

9. The method according to claim 8, wherein the second triggering operation comprises: a slide operation, a continuous-click/tap operation or a multi-finger operation.

10. The method according to claim 1, wherein
a prop exchange control is further displayed with the virtual scene, the prop exchange control being configured to exchange positions of the first virtual prop and the second virtual prop; and
the method further comprises:
in response to receiving a triggering operation on the prop exchange control, switching the positions of the first virtual prop and the second virtual prop displayed with the virtual scene.

11. An apparatus for displaying a virtual prop, comprising:
processing circuitry configured to
display a virtual scene, a first virtual prop and a second virtual prop being displayed with the virtual scene;
display exchange prompt information on the second virtual prop in response to a first triggering operation for the first virtual prop, the exchange prompt information indicating that the second virtual prop is exchangeable with the first virtual prop; and
in response to a dragging operation causing a position of the first virtual prop to meet a condition, switch positions of the first virtual prop and the second virtual prop displayed with the virtual scene.

12. The apparatus according to claim 11, wherein the processing circuitry is further configured to:
during the dragging operation, determine an overlapping ratio of the first virtual prop to the second virtual prop; and
in response to the overlapping ratio being greater than a threshold, switch the positions of the first virtual prop and the second virtual prop displayed with the virtual scene.

13. The apparatus according to claim 12, wherein
the first virtual prop is displayed in a first prop box displayed with the virtual scene, and the second virtual prop is displayed in a second prop box displayed with the virtual scene; and
the processing circuitry is further configured to:
display that the first prop box moves with the first virtual prop during the dragging operation; and
determine, based on the moved position of the first prop box during to the dragging operation, an overlapping ratio of the first prop box to the second prop box as the overlapping ratio of the first virtual prop to the second virtual prop.

14. The apparatus according to claim 12, wherein the processing circuitry is further configured to:
display the first virtual prop to its original position before the dragging operation in response to a determination that the overlapping ratio is not greater than the threshold.

15. The apparatus according to claim 11, wherein the processing circuitry is further configured to:
during the dragging operation, determine a current position of the first virtual prop with respect to the second virtual prop; and
in response to the current position of the first virtual prop being within an exchange range of the second virtual prop, switch the positions of the first virtual prop and the second virtual prop displayed with the virtual scene.

16. The apparatus according to claim 11, wherein the processing circuitry is further configured to:
obtain configuration information in response to the first triggering operation for the first virtual prop, the configuration information indicating the second virtual prop exchangeable with the first virtual prop; and
display the exchange prompt information on the second virtual prop based on the configuration information.

17. The apparatus according to claim 11, wherein the processing circuitry is further configured to:
display an empty box in response to the dragging operation moving the first virtual prop, the empty box indicating an original position of the first virtual prop prior to the dragging operation.

18. The apparatus according to claim 11, wherein
the first virtual prop and the second virtual prop are displayed in a prop region with the virtual scene; and
the processing circuitry is further configured to:
in response to detecting a second triggering operation in the prop region, switch the positions of the first virtual prop and the second virtual prop in the prop region.

19. The apparatus according to claim 18, wherein the second triggering operation comprises: a slide operation, a continuous-click/tap operation or a multi-finger operation.

20. A non-transitory computer-readable storage medium storing computer-readable instructions thereon, which, when executed by processing circuitry, cause the processing circuitry to perform a method for displaying a virtual prop, the method comprising:
displaying a virtual scene, a first virtual prop and a second virtual prop being displayed with the virtual scene;
displaying exchange prompt information on the second virtual prop in response to a first triggering operation for the first virtual prop, the exchange prompt information indicating that the second virtual prop is exchangeable with the first virtual prop; and
in response to a dragging operation causing a position of the first virtual prop to meet a condition, switching positions of the first virtual prop and the second virtual prop displayed with the virtual scene.

* * * * *